(12) United States Patent  
Levine et al.

(10) Patent No.: US 7,832,690 B1
(45) Date of Patent: Nov. 16, 2010

(54) TELESCOPING WING LOCKING SYSTEM

(75) Inventors: Bart Levine, Boise, ID (US); Keith Michael Field, Sherman Oaks, CA (US)

(73) Assignee: Mundus Group, Inc., Las Vegas, NV (US)

( * ) Notice: Subject to any disclaimer, the term of this patent is extended or adjusted under 35 U.S.C. 154(b) by 491 days.

(21) Appl. No.: 12/030,077

(22) Filed: Feb. 12, 2008

(51) Int. Cl.
*B64C 3/54* (2006.01)

(52) U.S. Cl. .................. 244/218; 244/123.11; 244/201

(58) Field of Classification Search .................. 244/46, 244/123.1, 123.11, 124, 201, 218, 219
See application file for complete search history.

(56) References Cited

U.S. PATENT DOCUMENTS 2,249,729 A * 7/1941 Fitzurka ..................... 244/218
4,824,053 A   4/1989 Sarh
2004/0069906 A1* 4/2004 Dockter et al. .............. 244/218
2009/0206193 A1* 8/2009 File ............................. 244/13

* cited by examiner

*Primary Examiner*—Tien Dinh
*Assistant Examiner*—Philip J Bonzell
(74) *Attorney, Agent, or Firm*—Dykas & Shaver, LLP; Elizabeth Herbst Schierman

(57) ABSTRACT

Disclosed is a telescoping wing locking system for use in aircraft having wings that collapse and expand in a telescoping fashion, such as aircraft designed for use on roadways. Companion wing segments are locked in place when gas is supplied to inflate a bladder located between overlapping sections of the wing segments. Wing segments are unlocked when gas is removed from the bladder so that it deflates and allows the wing segments to be moved relative to each other. The wing segments may be locked in any position relative to each other in which a section of one segment overlaps a section of the neighboring segment with the bladder between.

17 Claims, 1 Drawing Sheet

TELESCOPING WING LOCKING SYSTEM

FIELD OF THE INVENTION

The invention relates to generally to a system for controlling telescopic aircraft wing operation, and more particularly to a system for the locking of collapsible wing segments.

BACKGROUND OF THE INVENTION

To those familiar with the developing art of designing and constructing road-to-air crafts, the necessity for a collapsible wing system is obvious. One design for such collapsible wing system is the use of a telescoping aircraft wing in which a number of wing segments are used with more outboard segments being smaller than adjacent inboard wing segments such that the more outboard segments may be collapsed in a telescope fashion within a more inboard, neighboring, larger wing section.

Such a telescoping wing design is described in U.S. Pat. No. 4,824,053 to Branko Sarh. The '053 wing makes use of conventional metal rib forms where a metal skin is attached. Longitudinal spar segments associated with wing segments are tubular in shape and reduce in size the more outboard the spar is located. The assembly collapses in a telescopic manner.

In a telescoping wing assembly, wing segments must be securely locked into place once extended while maintaining rigidity in the deployed wing. In known telescoping wing assemblies, telescopically collapsible segments taper longitudinally to form conical shapes. Thus, when segments are extended telescopically, the broader bases of an internal, extending section come into contact with the narrower tops of the encompassing section and, due to the interference, are prevented from further extension. Accordingly, the wing segments are locked into the extended position due to contact inference between portions of neighboring segments.

While this achieves the goal of rigidity, there is a tendency for segments to stick or jam together so that the systems are prone to retraction failure. In any regard, in such systems great tensile force is necessary to collapse the assembly. This creates operational hazards when not accomplished smoothly. In addition, the need of custom fitting the collapsible segments increases the cost of segment fabrication and the interactions of the segments during extension and collapse leads to short lives of material at the zone of section contact.

SUMMARY OF THE INVENTION

Embodiments of the present telescoping wing locking system allow for rigid extension of telescopic wing segments while allowing for smooth retraction with less concern of wing segments becoming undesirably stuck together. Embodiments also allow for the locking of wing segments of a telescoping aircraft wing in various positions of extension. Finally, the present telescoping wing locking system may be used in wing assemblies using non-tapering wing segments, such as those in the shape of elliptical cylinders, which are much simpler and less expensive to fabricate.

The telescoping wing locking system includes a tubular bladder made of an elastomeric material and located inside a female wing segment and outside a male wing segment, which it encircles, in an area in which the female and male wing segments overlap. In some embodiments the exterior of the tubular bladder may be fixedly attached to the interior of the female wing segment. In other embodiments, the exterior of the tubular bladder may be fixedly attached to the exterior of the male wing segment.

To the tubular bladder is attached a gas-supply pipe such that the connection between the tubular bladder and the gas-supply pipe is sealed from the atmosphere. The gas supply pipe is configured to supply gas to the tubular bladder from a remote gas pressurization system located more inboard of the female wing segment.

To lock wing segments into place, gas is supplied to the tubular bladder via the remote gas pressurization system by way of the gas-supply pipe. As gas is supplied, the tubular bladder inflates to eliminate the slip clearance between the female and male wing segments, exerting a force on the wing segments sufficient to inhibit the sliding of one segment over the other. Wing segments may be so locked into place at any point in extension or retraction where the female wing segment overlaps the male wing segment where the tubular bladder is located between the two segments. Thus, an infinite number of locking positions are available.

To unlock wing segments, the remote pressurization subassembly is used to decrease the gas pressure within the tubular bladder so that the tubular bladder will deflate to once again allow for a slip clearance between the female and male wing segments. In this way, the male wing segment may be collapsed or otherwise retracted into the female wing segment. Further, because locking did not require segment-to-segment contact interference, the risk of retraction failure is greatly reduced.

The purpose of the foregoing summary is to enable the public, and especially the scientists, engineers, and practitioners in the art who are not familiar with patent or legal terms or phraseology, to determine quickly from a cursory inspection, the nature and essence of the technical disclosure of the application. The summary is neither intended to define the invention of the application, which is measured by the claims, nor is it intended to be limiting as to the scope of the invention in any way.

Still other features and advantages of the present invention will become readily apparent to those skilled in this art from the following detailed description describing preferred embodiments of the invention, simply by way of illustration of the best mode contemplated by carrying out my invention. As will be realized, the invention is capable of modification in various obvious respects all without departing from the invention. Accordingly, the drawings and description of the preferred embodiments are to be regarded as illustrative in nature, and not as restrictive in nature.

DESCRIPTION OF THE PREFERRED EMBODIMENTS

Figure 1:
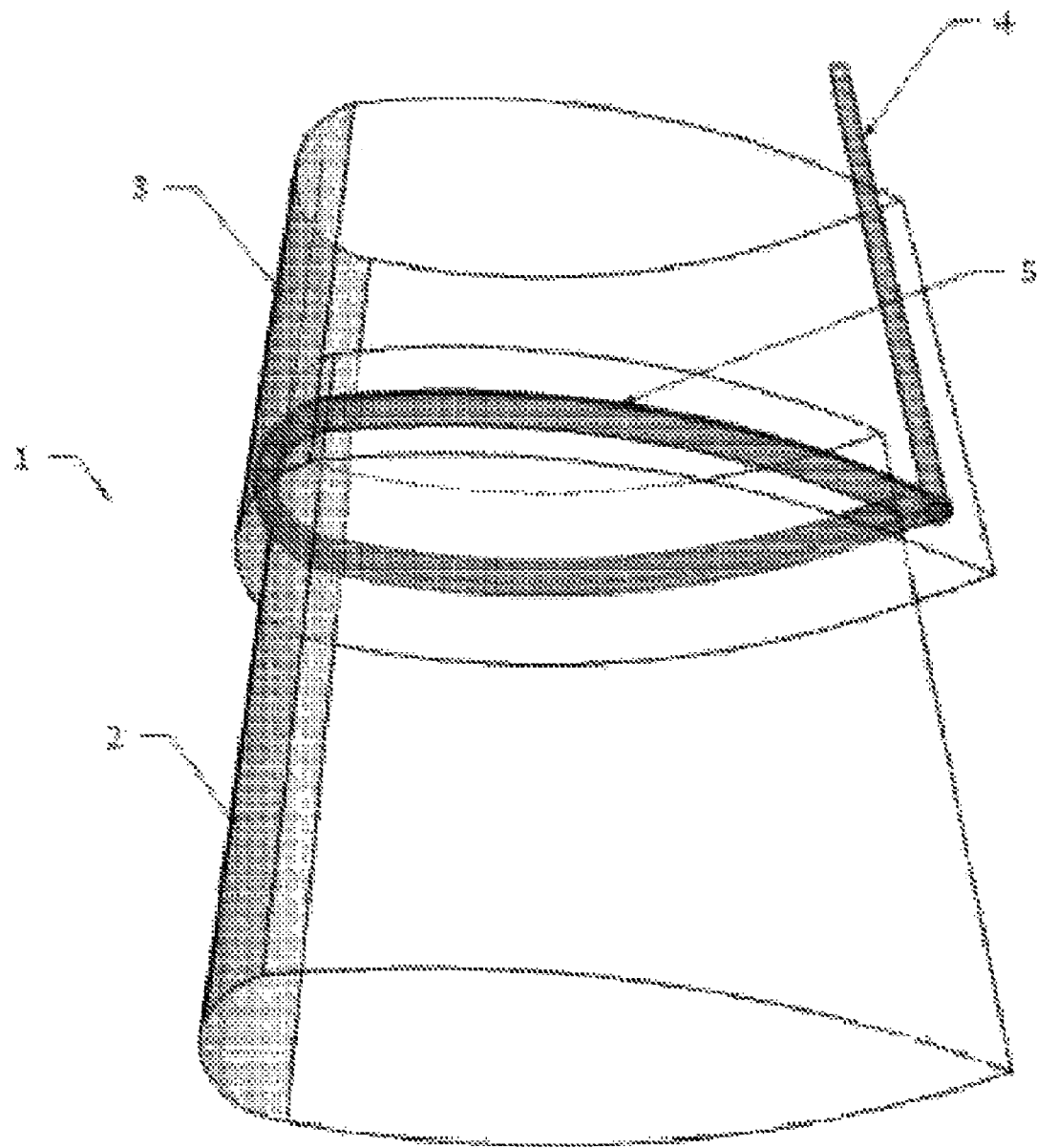
FIG. 1 is a perspective view of a first embodiment of the locking system in which the cover of the wing segments has been removed to allow a view of the locking system.

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

As shown in the FIGURE for purpose of illustration, the telescoping wing locking system is embodied in a system that allows for multiple locking positions while maintaining rigidity of the wings, reduces the risk of retraction failure, reduces the wear and tear of wing segments, and allows for the use of simpler wing segment shapes.

In the following description, the use of "or" indicates a non-exclusive alternative without limitation unless otherwise noted. The use of "including" means "including, but not limited to," unless otherwise noted.

An embodiment of the telescoping wing locking system is shown in FIG. 1. As shown in FIG. 1, the telescoping wing locking system 1 includes an inflatable bladder 5 that is configured to inflate when it is filled with gas and configured to deflate when the gas is not supplied. It is preferred that the inflatable bladder 5 be made of an elastomeric material having a high shear resistance to linear motion.

The inflatable bladder 5 is positioned between a female wing segment 3 and a male wing segment 2 where the female wing segment 3 is sized so that it may overlap the male wing segment 2. The inflatable bladder 5 is more specifically surrounds the male wing segment 2 in a location between the female wing segment 3 and the male wing segment 2 where the segments overlap. In the embodiment shown in FIG. 1, both the female wing segment 3 and the male wing segment 2 are of non-tapering cross-sectional areas.

In the preferred embodiment, the inflatable bladder 5 a substantially-cylindrical tube that is fixedly attached to the interior surface of the female wing segment 3 so that when the male wing segment 2 is extended away from the female wing segment 3 or retracted into the female wing segment 3, the inflatable bladder 5 remains stationary relative to the female wing segment 3. In other embodiments, the inflatable bladder 5 may be fixedly attached to the exterior surface of the male wing segment 2 so that when the male wing segment 2 is extended away from the female wing segment 3 or retracted into the female wing segment 3, the inflatable bladder 5 remains stationary relative to the male wing segment 2.

Gas-supply tubing 4 is connected to the inflatable bladder 5 and is configured to supply gas to and to remove gas from the inflatable bladder 5. It is preferred that the gas be supplied to the gas-supply tubing 4 via a remote pressurization subassembly (not shown) located inboard of the more inboard of the two wing segments 2, 3 and that such remote pressurization subassembly be fitted with venting valves and pressure regulation controls necessary to manage the gas pressure within the inflatable bladder 5 and the gas-supply tubing 4. It is also preferred that the gas-supply tubing 4 be configured so that the gas pressure within the inflatable bladder 5 is equal to the gas pressure within the gas-supply tubing 4. In some embodiments, the remote pressurization subassembly may be configured so that external air acts as the gas supply source.

In some embodiments, the system may use more than one inflatable bladder, each configured to inflate upon being supplied with gas and to deflate when not supplied with gas. Some embodiments may also include the use of an operating circuit that is configured to control pressurization of the inflatable bladder 5.

In one embodiment, the female wing segment 3 is attached to an aircraft fuselage (not shown) so that, when the inflatable bladder 5 is not inflated, the male wing segment 2 may be slideably moved either toward the fuselage as it is moved within the female wing segment 3 or away from the fuselage as it is moved out of the female wing segment 3. As such, the more outboard wing segments will be of a smaller cross-sectional area than the more inboard wing segments. In other embodiments, the male wing segment 2 may be attached to an aircraft fuselage so that, when the inflatable bladder 5 is not inflated, the female wing segment 3 may be moved either toward or away from the fuselage. As such, the more outboard wing segments will be of a larger cross-sectional area than the more inboard wing segments.

The embodiment depicted in FIG. 1 allows for the female wing segment 3 to be locked in place relative to the male wing segment 2 when gas is supplied to the inflatable bladder 5 via the gas-supply tubing 4. When gas is supplied to the inflatable bladder 5, it inflates and applies pressure to the interior surface of the female wing segment 3 and to the exterior surface of the male wing segment 2 and inhibits slippage of the segments 2, 3 relative to each other. Further, when gas is not supplied to the inflatable bladder 5, it deflates and the male wing segment 2 may be slideably moved relative to the female wing segment 3.

In an implementation of the embodiment depicted in FIG. 1, the male wing segment 2 may be in a first retracted position, contained mostly within the female wing segment 3. In this first retracted position, gas may be supplied to the inflatable bladder 5 such that it will inflate and lock the wing segments 2, 3 relative to each another such that slideable movement of the wing segments 2, 3 will be inhibited. The gas may then be removed from the inflatable bladder 5 such that the inflatable bladder 5 will deflate and unlock the wing segments 2, 3, allowing the male wing segment 2 to be expanded away from the female wing segment 3.

In the preferred embodiment, when the system is unlocked, the male segment 2 may be pulled out of the female wing segment 3 to extend the combined length of the two wing segments 2, 3, to any point where at least a portion of the female wing segment 3 overlaps the male wing segment 2, a portion in which the inflatable bladder 5 is located between the wing segments 2, 3. At any such position of extension, the inflatable bladder 5 may be inflated so as to lock the male wing segment 2 relative to the female wing segment 3. Correspondingly, the male wing segment 2 may be slideably moved from an expanded position to any more retracted position relative to the female wing segment 3 before again locking the segments 2, 3 relative to each other by again inflating the inflatable bladder 5.

According to the embodiment shown in FIG. 1, when the system is unlocked, i.e., when the inflatable bladder 5 is not inflated, the male wing segment 2 may be moved relative to the female wing segment 3. In this condition, the male wing segment 2 may be moved by any known extension/retraction means, such as by physically pushing/pulling the segment 3 or by use of the extension/retraction methods described in the aforementioned '053 patent.

The exemplary embodiments shown in the figures and described above illustrate but do not limit the invention. It should be understood that there is no intention to limit the invention to the specific form disclosed; rather, the invention is to cover all modifications, alternative constructions, and equivalents falling within the spirit and scope of the invention as defined in the claims.

While there is shown and described the present preferred embodiment of the invention, it is to be distinctly understood that this invention is not limited thereto but may be variously embodied to practice within the scope of the following claims. From the foregoing description, it will be apparent that various changes may be made without departing from the spirit and scope of the invention as defined by the following claims.

What is claimed is:

1. A telescoping wing locking system, comprising:
    at least one inflatable bladder configured to inflate upon being supplied with a gas and to deflate upon removal of said gas, said at least one inflatable bladder positioned between a female wing segment and a male wing segment, said female wing segment having a female wing interior surface, said male wing segment having a male wing exterior surface, said female wing interior surface being dimensioned to overlap at least a portion of said male wing exterior surface, said at least one inflatable bladder at least partially surrounding said male wing segment, and gas supply tubing connected to said at least one inflatable bladder and configured to supply said gas to and remove said gas from said at least one inflatable bladder, whereby, when gas is supplied to said at least one inflatable bladder via said gas supply tubing, said at least one inflatable bladder inflates and applies pressure to said female wing interior surface and to said male wing exterior surface, whereby, when inflated, said inflatable bladder inhibits slippage of said female wing segment relative to said male wing segment, and whereby, when deflated, said inflatable bladder does not inhibit slippage of said female wing segment relative to said male wing segment such that said female wing segment and male wing segment may be slideably moved relative to each from either a retracted position to an extended position or from said extended position to said retracted position.

2. The telescoping wing locking system of claim 1, further comprising:

at least one operating circuit configured to control pressurization of said at least one inflatable bladder.

3. The telescoping wing locking system of claim 1, wherein said at least one inflatable bladder is fixedly attached to said female wing interior surface.

4. The telescoping wing locking system of claim 1, wherein said at least one inflatable bladder is fixedly attached to said male wing exterior surface.

5. The telescoping wing locking system of claim 1, wherein said female wing segment is fixedly attached to an aircraft fuselage.

6. The telescoping wing locking system of claim 1, wherein said inflatable bladder comprises a substantially cylindrical inflatable brake member.

7. The telescoping wing locking system of claim 1, wherein said inflatable bladder comprises an elastomeric material having a high shear resistance to linear motion.

8. The telescoping wing locking system of claim 1, further comprising an external air supply subassembly configured to supply external air to said inflatable bladder.

9. The telescoping wing locking system of claim 1, wherein said female wing segment and said male wing segment are of essentially-nontapering cross-sectional area.

10. A compressed air locking system for use in an aircraft having telescoping wings and having a pneumatically-operable brake, comprising:

at least one inflatable bladder configured to inflate upon being supplied with a gas and to deflate upon removal of said gas, said at least one inflatable bladder positioned between a female wing segment and a male wing segment, said female wing segment having a female wing interior surface, said male wing segment having a male wing exterior surface, said female wing interior surface being dimensioned to overlap at least a portion of said male wing exterior surface, said at least one inflatable bladder at least partially surrounding said male wing segment, gas supply tubing connected to said at least one inflatable bladder and configured to supply said gas to and remove said gas from said at least one inflatable bladder, and at least one operating circuit configured to control pressurization of said at least one inflatable bladder, whereby, when gas is supplied to said at least one inflatable bladder via said gas supply tubing, said at least one inflatable bladder inflates and applies pressure to said female wing interior surface and to said male wing exterior surface, whereby, when inflated, said inflatable bladder inhibits slippage of said female wing segment relative to said male wing segment, and whereby, when deflated, said inflatable bladder does not inhibit slippage of said female wing segment relative to said male wing segment such that said female wing segment and male wing segment may be slideably moved relative to each other from either a retracted position to an extended position or from said extended position to said retracted position.

11. The compressed air locking system of claim 10, wherein said at least one inflatable bladder is fixedly attached to said female wing interior surface.

12. The compressed air locking system of claim 10, wherein said at least one inflatable bladder is fixedly attached to said male wing exterior surface.

13. The compressed air locking system of claim 10, wherein said female wing segment is fixedly attached to an aircraft fuselage.

14. The compressed air locking system of claim 10, wherein said inflatable bladder comprises a substantially cylindrical inflatable brake member.

15. The compressed air locking system of claim 10, wherein said inflatable bladder comprises an elastomeric material having a high shear resistance to linear motion.

16. The compressed air locking system of claim 10, further comprising an external air supply subassembly configured to supply external air to said inflatable bladder.

17. The compressed air locking system of claim 10, wherein said female wing segment and said male wing segment are of essentially-nontapering cross-sectional area.

* * * * *